US008381264B1

(12) United States Patent
Corddry et al.

(10) Patent No.: US 8,381,264 B1
(45) Date of Patent: Feb. 19, 2013

(54) MANAGING HARDWARE REBOOT AND RESET IN SHARED ENVIRONMENTS

(75) Inventors: Matthew T. Corddry, Seattle, WA (US); Michael David Marr, Monroe, WA (US); James R. Hamilton, Seattle, WA (US); Peter N. De Santis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 411 days.

(21) Appl. No.: 12/557,411

(22) Filed: Sep. 10, 2009

(51) Int. Cl.
*G06F 7/04* (2006.01)
*G06F 15/16* (2006.01)
*G06F 17/30* (2006.01)
*H04L 29/06* (2006.01)

(52) U.S. Cl. ......................................................... 726/3
(58) Field of Classification Search ........................ 726/4
See application file for complete search history.

(56) References Cited

U.S. PATENT DOCUMENTS

| | | | |
|---|---|---|---|
| 4,939,382 A | 7/1990 | Gruodis | |
| 5,530,753 A | 6/1996 | Easter et al. | |
| 5,799,086 A | 8/1998 | Sudia | |
| 5,819,087 A | 10/1998 | Le et al. | |
| 5,937,169 A | 8/1999 | Connery et al. | |
| 6,009,274 A | 12/1999 | Fletcher et al. | |
| 6,385,727 B1 | 5/2002 | Cassagnol et al. | |
| 6,615,349 B1 | 9/2003 | Hair | |
| 6,665,725 B1 | 12/2003 | Dietz et al. | |
| 6,944,854 B2 | 9/2005 | Kehne et al. | |
| 6,957,328 B2 | 10/2005 | Goodman et al. | |
| 7,055,148 B2 | 5/2006 | Marsh et al. | |
| 7,266,595 B1 * | 9/2007 | Black et al. ................... 709/223 |
| 7,293,129 B2 | 11/2007 | Johnsen et al. | |
| 7,305,668 B2 | 12/2007 | Kennedy et al. | |
| 7,305,711 B2 | 12/2007 | Ellison et al. | |
| 7,350,083 B2 | 3/2008 | Wells et al. | |
| 7,406,518 B2 | 7/2008 | Lasserre | |
| 7,506,149 B2 | 3/2009 | Rothman et al. | |
| 7,512,684 B2 | 3/2009 | Ronciak et al. | |
| 7,526,516 B1 | 4/2009 | Pavlyushchik | |
| 7,730,295 B1 | 6/2010 | Lee | |
| 7,739,422 B2 | 6/2010 | Hua et al. | |
| 7,739,487 B2 | 6/2010 | Mylly et al. | |

(Continued)

OTHER PUBLICATIONS

Viswanathan, A., "Virtualization with XEM," *Trusted Computing CS599*, University of Southern California, 21pp. (Spring 2007).

(Continued)

*Primary Examiner* — Carl Colin
*Assistant Examiner* — John Elmore
(74) *Attorney, Agent, or Firm* — Novak Druce Connolly Bove + Quigg LLP

(57) ABSTRACT

In an environment such as a cloud computing environment where various guests can be provisioned on a host machine or other hardware device, it can be desirable to prevent those users from rebooting or otherwise restarting the machine or other resources using unauthorized information or images that can be obtained from across the network. A cloud manager can cause one or more network switches or other routing or communication processing components to deny communication access between user-accessible ports on a machine or device and the provisioning systems, or other specific network resources, such that the user cannot cause the host machine to pull information from those resources upon a restart or reboot of the machine. Further, various actions can be taken upon a reboot or attempted reboot, such as to isolate the host machine or even power off the specific machine.

28 Claims, 5 Drawing Sheets

U.S. PATENT DOCUMENTS

| | | |
|---|---|---|
| 7,796,646 B2 | 9/2010 | Das et al. |
| 7,836,226 B2 | 11/2010 | Flynn et al. |
| 8,102,881 B1 | 1/2012 | Vincent |
| 2002/0073304 A1 | 6/2002 | Marsh et al. |
| 2002/0080784 A1 | 6/2002 | Krumel |
| 2002/0092008 A1 | 7/2002 | Kehne et al. |
| 2002/0150243 A1 | 10/2002 | Craft et al. |
| 2002/0157011 A1 | 10/2002 | Thmoas, III |
| 2003/0005276 A1 | 1/2003 | French et al. |
| 2003/0023966 A1 | 1/2003 | Shimizu et al. |
| 2003/0058860 A1* | 3/2003 | Kunze et al. ............... 370/392 |
| 2003/0074657 A1 | 4/2003 | Bramley, Jr. |
| 2003/0115471 A1 | 6/2003 | Skeba |
| 2003/0185207 A1 | 10/2003 | Nakahara |
| 2004/0015941 A1 | 1/2004 | Sekine |
| 2004/0024917 A1 | 2/2004 | Kennedy et al. |
| 2004/0025036 A1 | 2/2004 | Balard et al. |
| 2004/0049669 A1 | 3/2004 | Schelling et al. |
| 2004/0071142 A1 | 4/2004 | Moriwaki et al. |
| 2004/0088542 A1 | 5/2004 | Daude et al. |
| 2004/0117640 A1* | 6/2004 | Chu et al. ............... 713/188 |
| 2004/0128549 A1 | 7/2004 | Poisner |
| 2004/0158702 A1 | 8/2004 | Tasaki |
| 2004/0162915 A1 | 8/2004 | Caronni et al. |
| 2004/0187103 A1 | 9/2004 | Wickham et al. |
| 2004/0249974 A1 | 12/2004 | Alkhatib et al. |
| 2005/0131997 A1* | 6/2005 | Lewis et al. ............... 709/203 |
| 2005/0188102 A1 | 8/2005 | Madajczak |
| 2005/0207421 A1 | 9/2005 | Suzuki |
| 2005/0265351 A1* | 12/2005 | Smith et al. ............... 370/395.2 |
| 2006/0015751 A1 | 1/2006 | Brickell et al. |
| 2006/0026301 A1 | 2/2006 | Maeda et al. |
| 2006/0047938 A1 | 3/2006 | Park et al. |
| 2006/0047942 A1 | 3/2006 | Rothman et al. |
| 2006/0080522 A1* | 4/2006 | Button et al. ............... 713/2 |
| 2006/0107071 A1 | 5/2006 | Girish et al. |
| 2006/0143473 A1 | 6/2006 | Kumar |
| 2006/0159088 A1 | 7/2006 | Aghvami et al. |
| 2006/0174109 A1 | 8/2006 | Flynn |
| 2006/0182103 A1 | 8/2006 | Martini et al. |
| 2006/0277346 A1 | 12/2006 | Doak et al. |
| 2007/0168652 A1 | 7/2007 | Mylly et al. |
| 2007/0223483 A1 | 9/2007 | Huang et al. |
| 2008/0083036 A1 | 4/2008 | Ozzie et al. |
| 2008/0086729 A1 | 4/2008 | Kondoh et al. |
| 2008/0104701 A1 | 5/2008 | Peacock et al. |
| 2008/0147965 A1 | 6/2008 | Eriksson et al. |
| 2008/0225875 A1 | 9/2008 | Wray et al. |
| 2008/0295098 A1 | 11/2008 | Cardona et al. |
| 2008/0307229 A1 | 12/2008 | Andersson et al. |
| 2009/0034431 A1 | 2/2009 | Nagarajan et al. |
| 2009/0094421 A1 | 4/2009 | Lewis |
| 2009/0138875 A1 | 5/2009 | Rothman et al. |
| 2009/0300149 A1* | 12/2009 | Ferris et al. ............... 709/222 |
| 2010/0023777 A1 | 1/2010 | Prevost et al. |
| 2010/0070623 A1 | 3/2010 | Sawada |
| 2010/0100733 A1* | 4/2010 | Jaber et al. ............... 713/168 |
| 2010/0107162 A1 | 4/2010 | Edwards et al. |
| 2010/0266132 A1 | 10/2010 | Bablani et al. |
| 2010/0293289 A1 | 11/2010 | Hsu et al. |

OTHER PUBLICATIONS

Preboot Execution Environment (PXE) Specification, version 2.1, Sep. 20, 1999.

* cited by examiner

MANAGING HARDWARE REBOOT AND RESET IN SHARED ENVIRONMENTS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, users may want special hardware or full access to specific hardware resources. Such access comes with risks for providers of those resources, however, as in a cloud or other shared environment there typically will be other users sharing those resources at various times, and a modification of the resource by one user can potentially be detrimental to subsequent users. Host machines and other hardware devices often include options to reboot or otherwise restart or reset using specific information, such as may be obtained over the cloud or network. In some cases, a user can cause such a machine to reboot and, during the boot process, load a customer image or other information that can affect the operation of the machine or any devices in communication therewith. In order to ensure that one user does not alter the hardware, firmware, or software in an inappropriate way that will affect other users, such as by altering firmware to inject malicious code, it can be necessary to re-image and/or reconfigure the resource after each user. Such an approach might be acceptable in situations where users have dedicated access to a resource for an extended period of time, but in a cloud or similar environment where the user of a resource could change several times over a short period of time, such an approach can be too expensive and resource intensive.

BRIEF DESCRIPTION OF THE DRAWINGS

Various embodiments in accordance with the present disclosure will be described with reference to the drawings, in which.

DETAILED DESCRIPTION

Figure 1:
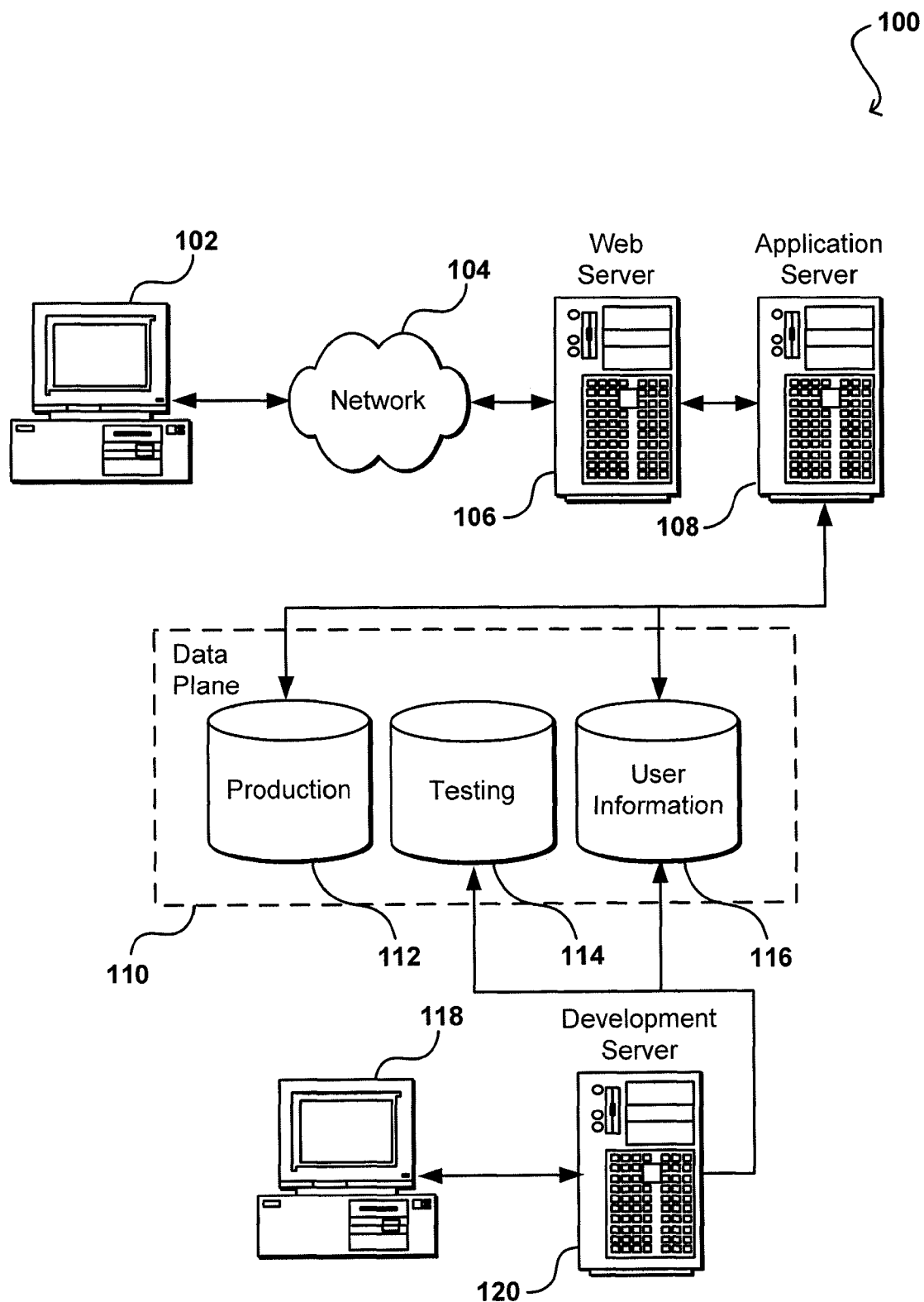
FIG. 1 illustrates an environment in which various embodiments can be implemented.

Systems and methods in accordance with various embodiments of the present disclosure may overcome one or more of the aforementioned and other deficiencies experienced in conventional approaches to managing resources in an electronic environment. In various embodiments, users are provided with full or substantially full "native" access to one or more hardware resources in a network, cloud, or other shared environment. In other embodiments, users have access to only one or more devices or components, such as a network interface card (NIC) or graphics processing unit (GPU) on a peripheral component interconnect (PCI) bus, on a host machine. In situations where the users having access to such a resource can change frequently, it can be desirable to prevent users from modifying, or at least track or act upon the attempted modifying, of firmware or other configuration information for the resource, which can affect an ability of a subsequent user to effectively or securely utilize the resource.

Systems and methods in accordance with various embodiments can substantially prevent a provisioned user or guest operating system (OS) on a host machine or other such device from accessing provisioning and other such systems across a network during reboot or other such phases of operation. In some embodiments, machines can be configured to prevent the machines from rebooting themselves. In other embodiments, the states of various ports can be managed such that the ports allow specific communications during a "provisioning" or similar state, but do not allow for such communications during "provisioned" or similar state. In various embodiments, a cloud manager or similar component can update configuration information used by one or more intelligent switches or routers across a cloud or network to prevent machines from having access to provisioning systems or similar resources across the network when a user is provisioned on the machine. Such an approach can be desirable in at least some embodiments as the management is accomplished external to the host machine, such that a user does not have access to the components managing the communications between the host machine and the provisioning or other systems.

In some embodiments, a monitoring component such as a cloud manager can monitor messages and other such network activity relating to a particular device or host machine. For example, a host machine that is in the early stages of a reboot will often send messages to perform configuration-related tasks such as to obtain an IP address (e.g., Dynamic Host Configuration Protocol (DHCP)) or establish domain credentials. A monitoring component can detect these messages as the "fingerprint" of a reboot, and can take one or more appropriate actions with the assumption that a reboot has occurred.

Systems and methods in accordance with various embodiments also can apply various policies or rule sets to events such as reboots or attempted restarts, for example. These policies, which can vary depending upon factors such as the user or type of resource, can define actions to take in response to these events. These actions can include, for example, logging information for spurious reboots, such as may result from a software or power glitch. Other actions can include isolating the host, disabling certain communications or functions, limiting user access to specific resources, or even removing power from a device where the state of the machine is unknown or potentially compromised. Various other examples are described with respect to the various embodiments.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing testing data 114, which can be used with the user information for the testing side. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 or development server 120, and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
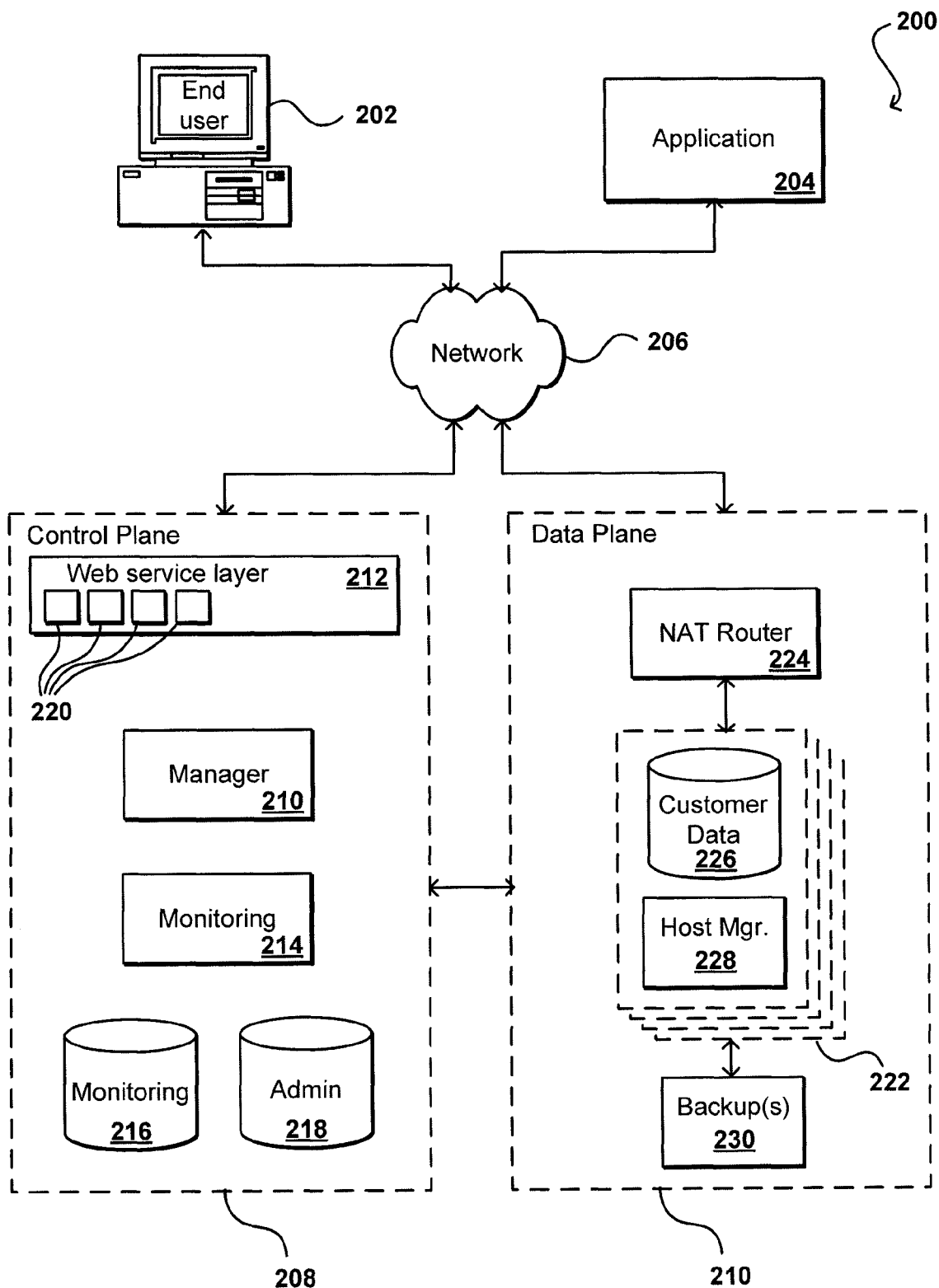
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a DNS address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the DNS address and a port address to be used to access a resource. A user then can access the resource directly using the DNS address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request. Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. Providing this level of access to a resource comes with potential risks for a provider of the resource, as a user having native access to the device can have the ability to modify firmware or other configuration information for the resource, which can affect the ability of a subsequent user to utilize the resource without first re-imaging or otherwise verifying the state of the resource.

Systems and methods in accordance with various embodiments enable a provider to grant a user or customer with substantially full access to a hardware resource with a reasonable level of security. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In the some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and more simple guest instance images can be used, as guests do not need a multitude of hardware-specific drivers. Such virtualization can come with potentially significant costs, however, as virtualization can incur order-of-magnitude performance penalties for hardware that does not include native acceleration for virtualization, and virtualization of a particular hardware device can consume substantial resources unrelated to that device (e.g., a processor and/or memory used to virtualize a network interface). Also, virtualization support can lag years behind commodity availability of new hardware (e.g., video cards), and certain appliance hardware is often too specific or "niche" to ever warrant compelling virtualization support. There are potentially large market opportunities in supporting high-margin niche appliances or in being the first-to-market for cloud support of new hardware types. Providing such support through native access, however, can leave vulnerable various aspects of the internal cloud, such as provisioning technology, billing, resource utilization and balancing, and the network layer-2 layout, for example, and can violate threat models well beyond customer requirements.

Systems and methods in accordance with various embodiments can provide for "partial" or "substantially" full access to a resource, such as a host server, by providing users with native access to the host hardware or specific devices, such as cards plugged into a peripheral control bus or similar datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine hosting an running OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some instances, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

One of the main issues with providing customers with native access to specific hardware is that customers may have the ability to modify privileged configuration or BIOS (basic I/O system) settings, or other firmware images on host hardware. These changes can persist across a reboot of the physical system, such that the hardware may not return to the same state that the hardware was in before that customer was granted access to the device(s). In the case of configurable settings for a virtual machine monitor (VMM), such as a Ring-1 hypervisor, for example, the changes would in general not persist across reboot, but could persist across instantiations of guest operating systems in a virtualized environment (e.g., chipset settings to support IOMMU technology). This ability for a customer to modify settings or firmware that otherwise should be immutable can have serious security implications. For example, malicious software (e.g., Trojans or viruses) can be inserted into firmware for various devices. Even if firmware changes do not involve intentionally malicious programming, however, the changes still can still be unintentionally damaging by causing performance and/or compatibility issues. Firmware flashing can potentially physically destroy the hardware irreparably (a.k.a. "bricking" the hardware). Certain technologies have been developed that may address at least some of these challenges, particularly for motherboard chipsets. These technologies include, for example, Trusted Platform Module (TPM), LaGrande Technology (LT) from Intel, measured boot technology, trusted boot technology, Dynamic Root of Trust (DRTM), and Static Root of Trust (SRTM) technology. None of these solutions, however, address various issues specific to device firmware, entire hosts, and other such hardware aspects.

Figure 3:
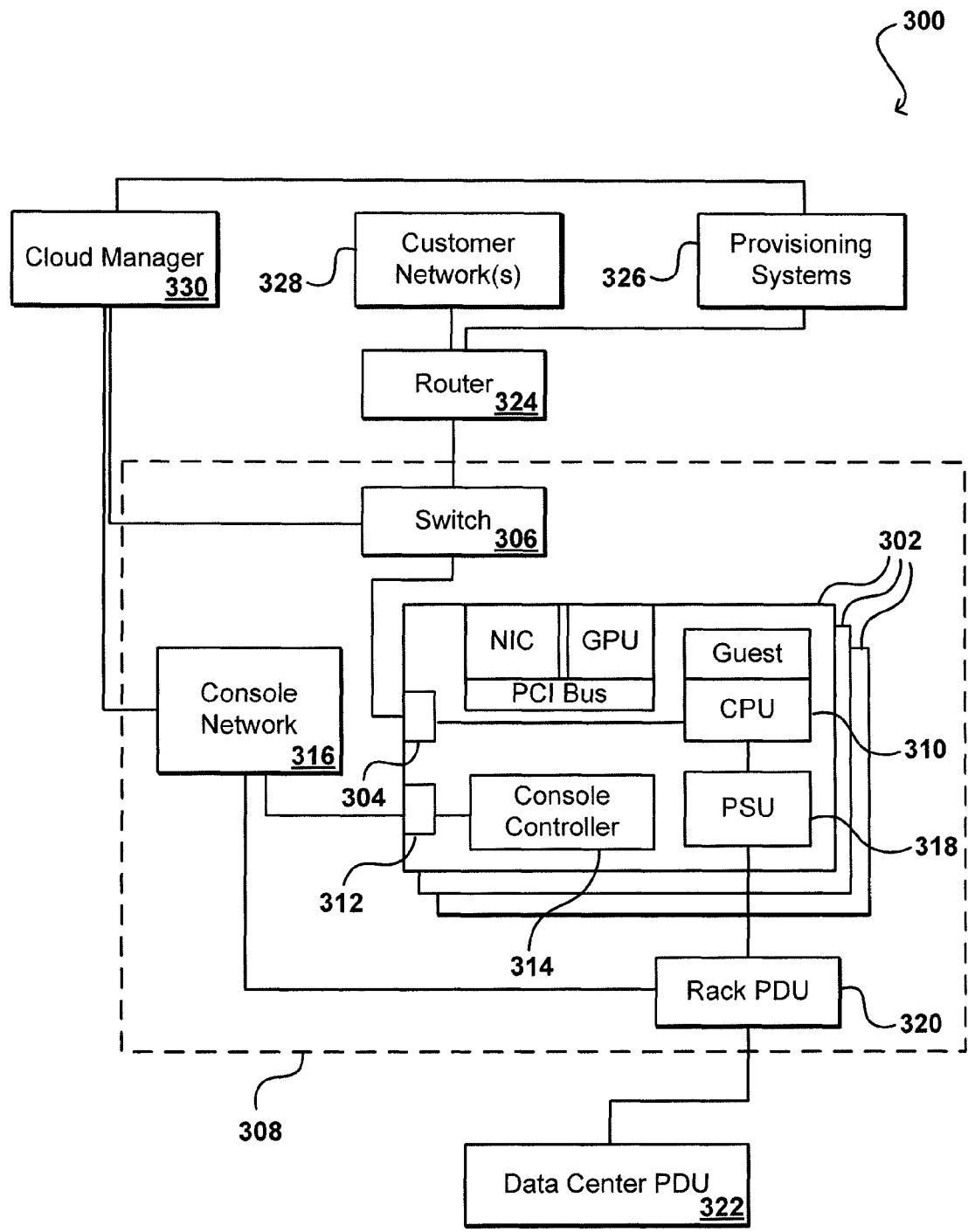
FIG. 3 illustrates a configuration for accessing specific hardware resources that can be used in accordance with one embodiment.

Systems and methods in accordance with various embodiments can prevent and/or monitor the access and/or manipulation of configuration or firmware information by guests in a cloud or similar electronic environment. In certain embodiments, a customer can be provided with dedicated guest access to a hardware resource for any desired period of time, such as a matter of hours or even minutes. FIG. 3 illustrates an example of a configuration 300 that can be used to provide such native access to a customer in accordance with one embodiment. This example will be discussed with respect to granting a user access to a peripheral device in a host machine using conventional PCI-based technology, but it should be understood that this is merely an example and that approaches within the scope of the various embodiments can be used with any appropriate hardware, software, and protocols currently used or subsequently developed for such purposes.

This example configuration 300 includes a set of host devices 302, such as servers or similar devices, that each can have a series of network ports 304. Some of these ports can function as "production" ports which connect each host to at least one "smart" network switch 306 capable of processing and routing network traffic to/from each device. In a data center example, there might be one smart switch for each rack of servers 308, for example. At least one of these network ports 304 can be used by a guest operating system for a host, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

At least one router 324 can connect the host devices to one or more provisioning systems 326, and the switch and/or router can manage access to these provisioning systems. In some embodiments, network traffic within a rack is aggregated in order to minimize the number of cables leaving each rack. In some embodiments a capability such as a preboot execution environment (PXE) exists on a host machine 302 at the production network port 304, such that power can be cycled using the console and when the machine boots the PXE code can execute on the network port. When the switch 306 is configured to connect a host machine 302 to the provisioning systems, the PXE can connect the device to the provisioning systems and boot the machine into a RAM (random access memory) disk or other block of storage, for example, which enables control operations such as firmware flashing or provisioning of a new customer image. A RAM disk with specialized drivers in one embodiment can be used to boot and/or run an untrusted or unknown image, which might not otherwise be able to boot on a specific machine. Provisioning images thus can be received, over the network to the PXE, which contain provisioning code or firmware flashing code. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management.

As discussed, a user or guest operating system (OS) having native or substantially full access to a host machine or other hardware device can have the ability to modify various aspects of the device, such as the firmware and other configuration information. Further, a user can have the ability to restart or reboot various hardware devices, many of which can be programmed to access information from across a network that can be used to configure these devices. Such functionality can enable a user to perform tasks such as loading an unapproved customer image onto a device, modifying functionality of the device, or any of a number of other such tasks. Such use can not only affect subsequent users of these devices, but also can affect other resources or availability in a cloud or other such network.

For example, a host machine such as a server can include instructions that allow a user, guest OS, CPU, or other such source to cause the machine to reset, such as to reboot a host server. When a machine such as a server in a cloud boots, the machine can boot from one or more sources across the cloud or another such network. If a user modifies the instructions, firmware, or other such configuration information used during the boot process, the user can cause the server to perform functions such as to load unauthorized operating system images, expose certain unauthorized information or functionality, install or activate unapproved applications on the server, or any of a number of other such actions. One option for avoiding such situations is to block the ability for a machine to reboot itself from over the network once a user is provisioned on the machine. Such options can be specified in firmware or secure memory on the device, such that any attempt to trigger a reboot coming from the guest OS or CPU, for example, can fail. In some cases, the attempted reboot also can trigger another action, such as notifying a resource provider about the attempted action. While such a process can be advantageous in certain circumstances, the level of security might not be sufficient for all providers. For example, if the access setting(s) or similar information is stored on the machine to which the user has access, the information is potentially at risk of being modified by the user. Further, some users provisioned on a device might desire and/or require the ability to reboot for certain reasons, such that a hardware solution preventing such action may be undesirable.

In some embodiments, a device can be prevented from booting or rebooting from the network, also referred to herein as "netbooting," when a guest is provisioned on the machine by utilizing one or more components that are external to the machine, and thus may not be exposed to the guest user. In one embodiment, which will be described with respect to the configuration 400 of FIG. 4, a component such as a "smart" network switch 424 can be used to disable access between a host machine 404 and the components such as the cloud manager 414 and provisioning systems 420 that form part of the network reboot infrastructure. An example of a smart switch that can be used for such purposes is a fixed-configuration, enterprise class switch such as the Catalyst 3560 Series of switches from Cisco Systems, Inc. As discussed with respect to FIG. 2, a cloud computing or similar environment can utilize a control plane segmentation to control the provisioning of resources and other such aspects of the components of the data plane. A cloud manager 414 or other such component of the control plane can update information provided to specific components in the data plane or cloud to prevent access to provisioning systems and other such resources. For example, when a guest operating system (OS) for a customer network 402 is loaded on a machine 404, the cloud manager initiating the provisioning of the guest on the machine can also send instructions to a network switch 424, for example, which can have resident memory 416 or another storage mechanism for storing information for that machine. The instructions can indicate to the switch that the machine is provisioned to a customer, or at least that access to the provisioning systems or other such components useful for netbooting should be disallowed. At such time as the user is no longer provisioned on the machine, or any other appropriate time, the cloud manager 414 can send instructions to the switch 424 to allow such communications. Although in this example information is stored on the switch, it should be understood that the information used to allow or disallow communications with network components can be stored external to the switch, either in the control plane or data plane, and in some embodiments can be stored in a secure location, or at least a location isolated from unauthorized users, on the host machine itself. Once a state of the machine is set to a customer state or similar value in the switch in this example, the switch will not allow communications from a network port 406 of the machine to access any of the provisioning systems 420 or other network resources even in the event of a reboot, restart, power on, or other such event.

In some embodiments where all access to provisioning systems and similar resources is denied, it can be necessary not only to reset, re-image, and/or re-provision a machine in order to grant access to a new user, but it also can be necessary to reset components to which the user might not have access, such as any network switches, encapsulation approaches or mappings, and other access controls that will configure the switches, routers, and other such components to again allow the host machine to communicate with the provisioning and such control plane systems to perform actions such as to boot from the network. If a subsequent user is not to be granted the ability to reboot, the configuration information can again be changed after the necessary updates to the machine have been made and the machine is ready to be provisioned. In some cases where a manual reboot is done from disk or another such source, the configuration information may not need to be changed, as the host machine may not need to perform network boot actions even during the reimaging or other such process.

In some embodiments, a port on the host machine can be set in one of at least two states using a software-based control mechanism, such as may be set by a cloud manager or similar component or system. For example, a network port 422 on a host machine 404 can be set to a configuration-friendly state, such as a "provisioning" state, which would allow the machine to communicate with the provisioning system(s) 420 and other such components. After the machine is provisioned but before the user is granted full access to the machine, the guest OS is loaded, or any other such action, the cloud manager 414 can set the state of the port 422 to a second state, such as a "running" or "provisioned" state, wherein no communication to, or from, the provisioning system or other such network components will be allowed. In some embodiments, certain ports can be exposed to certain network components while other ports are closed with respect to those and/or other components, or some ports can be configured to only allow certain types of communications, etc. Such use of ports also can be advantageous for various customers, as network components also can be prevented from getting access to the customer networks, or other customer components, whereby the customer can be relatively shielded from compromising of a network component. In embodiments where a port is set to a "provisioning" state, the port can be configured to only communicate with provisioning systems, tools, and devices, in order to minimize the ability of a malicious actor to inject code into, or otherwise affect, the provisioning process. The configuration information preferably is stored securely such that the information cannot easily be modified by a guest OS, for example.

Figure 4:
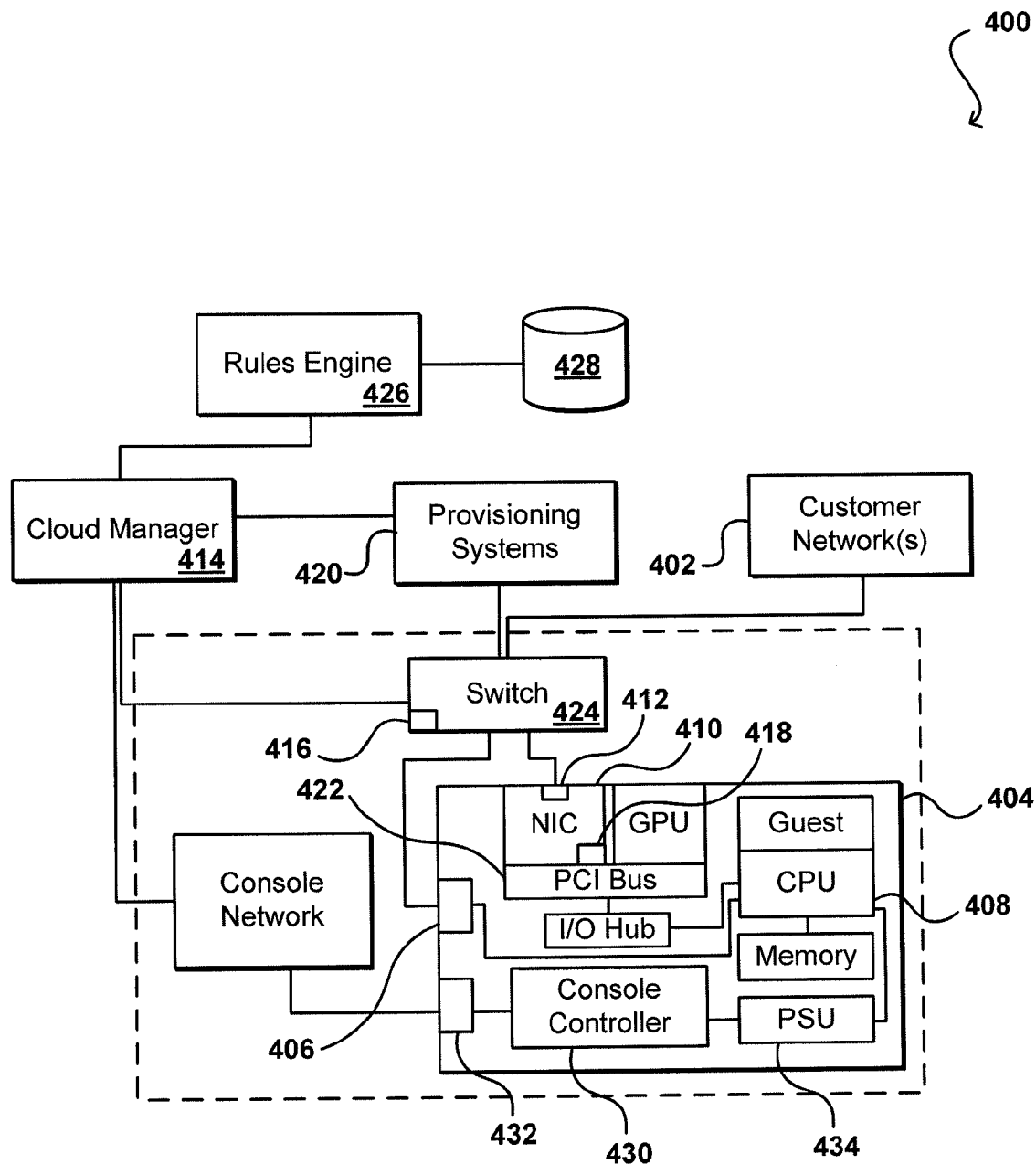
FIG. 4 illustrates a configuration for managing access between a provisioned host machine and provisioning systems that can be used in accordance with one embodiment.

Further, it should be understood that the configuration of FIG. 4 is merely an example of one possible configuration, and that many other configurations can be used within the scope of the various embodiments. For example, various types of network interface can be used to perform tasks such as communicating with provisioning systems and providing a secure channel inaccessible to a user of a host machine. For example, an interface can be provided via any component connected to a PCI or other high speed bus, and an interface can exist on a northbridge, southbridge, or other controller hub on a host machine. Further, dedicated network interfaces may be built into a machine or device. There can be multiple I/O hubs or communication paths in some embodiments, while functionality is highly integrated and not provided by discrete components in other embodiments, as various functionality can be delivered "logically" in a number of different ways as known in the art.

Figure 5:
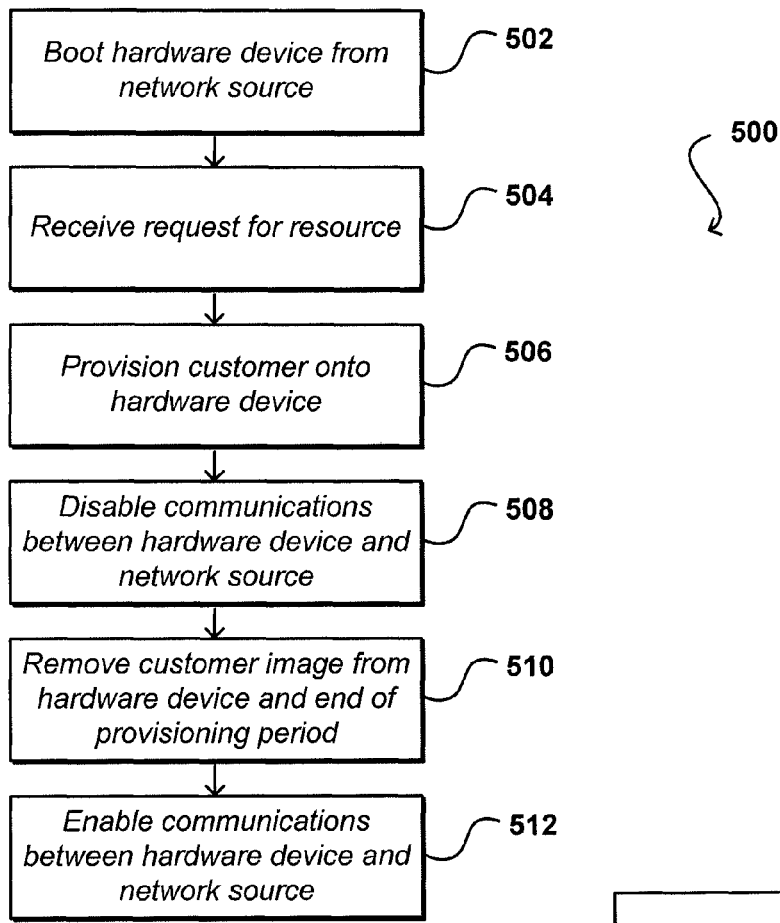
FIG. 5 illustrates an example of a process for managing access between a provisioned host machine and provisioning systems that can be used in accordance with one embodiment.

FIG. 5 illustrates an example process 500 for preventing unauthorized booting of a machine from across a network that can be used in accordance with one embodiment. In this example, a hardware device such as a host machine is caused to boot from a network source 502, such as a provisioning system. The hardware device can be in what is referred to herein as an "administrative network" context, as the device does not have a user provisioned thereon and further can communicate with various administrative systems such as provisioning and management systems. Although host systems and booting are discussed in the example for purposes of explanation, it should be understood that other startup or similar processes for various hardware devices can be used in accordance with various embodiments, and that the steps of this and other processes discussed herein can be performed with fewer, additional, or alternative steps in various orders and/or in parallel, etc., unless otherwise specifically stated.

For environments such as cloud environments, a request for a resource such as a host machine can be received from a user 504, such as to a cloud manager or control plane, for example. The cloud manager can determine that the host machine is available and matches the type of resource for the request, and can provision a customer image for the user onto the machine 506. In some embodiments, the customer image can be retrieved from a provisioning system residing in, or accessible to, the cloud. Once the customer image is provided to the machine, the cloud manager (or provisioning system or other such component) can send an instruction to one or more network switches in the cloud, or to a data store holding information to be used by the various network switches, that can deny access and/or routing of communications from a network port of the host machine to any specified provisioning systems or other network systems or components capable of being used by a user to netboot the machine 508. In cases where a device has one or more console ports and/or other ports that are not exposed to the user, these ports can be allowed to communicate with the provisioning and other such systems, but any port or path that is accessible by a guest user or OS provisioned on the system can have information set at, or for, one or more network switches to prevent at least the user-accessible portion of the machine from accessing these systems. The host machine thus can be placed into what is referred to herein as a "user network" context, wherein a customer image is provisioned on the machine and/or a user has access to the host machine, but the host machine is unable to communicate with specific administrative network resources, such as provisioning and management systems. When the request is completed, or when the customer is otherwise no longer to be provisioned on the device, the customer image can be removed from the machine 510. Once the customer image is removed, and in some embodiments after the machine has been re-imaged and/or reconfigured such that any malicious or unauthorized code is removed from the machine, the cloud manager can send instructions that cause the switches to again allow the host machine to communicate with the provisioning systems 512, such that the cloud manager can utilize those and other such systems until a customer is provisioned on the machine who should not have access to those systems. The machine thus can be switched back into an "administrative network" context. In cases where a console or external port, inaccessible to the user, can be used to provision the machine, the switch can be configured to never allow communications between user-accessible ports and the provisioning system, or any of a number of other such variations. In cases where network ports have their states changed based on customer provisioning, those ports can again be allowed to communicate with the provisioning systems once the customer is removed from the device.

In some embodiments, there still can be the possibility that a user or guest OS can access configuration information, such as state information for a port, or gain access to the switch information to enable communications, for example, whereby the user can enable netbooting and/or other such actions. Thus, it can be desirable in at least some embodiments to utilize an additional (or alternative) approach to handling rebooting or resetting of a machine. Systems and methods in accordance with various embodiments provide for the monitoring, auditing, tracking, alerting, and/or other such actions performed in response to a detected reboot or similar action. In the event that a system reboots, or at least attempts to reboot, information can be stored to a log or other such location, internal or external to the host machine. This can include information such as the time, date, provisioned user, host machine, version information before and/or after reboot, and other such information. In addition or in place of storing this information to a log, an alert or other communication can be sent to an appropriate location, such as a cloud manager system, whereby one or more appropriate actions can be taken based on the reported action. For example, if a reboot or other reset attempt is detected, a notification can be sent to the user notifying that a reboot attempt was detected (in case the user was unaware of such activity) and/or notifying the user that repeated reboot attempts can potentially result in denial of service, etc. In other embodiments, a message indicating that a machine rebooted unexpectedly or from an unauthorized source can cause an administrator or other employee of the provider to examine the status of the machine and potentially isolate or shut down that machine or instance. Various other actions can be taken as well within the scope of the various embodiments.

Other detection mechanisms can also be applied. For example, network traffic can be monitored "upstream" of the host to detect messages that tend to occur around reboots from which it might be inferred that a reboot has likely occurred. The monitoring in various embodiments can occur via offline-processing of logs or in real-time, for example. In one example, DHCP requests or other such network activities can be detected that tend to occur during the boot phases of network connected hosts when establishing connectivity, such as to obtain an IP address or establish domain credentials. In other embodiments, the timing of network packets can be monitored to detect activity indicative of a network reboot.

In some embodiments, actions may not be taken immediately upon detection of a reboot, but information can instead be written to a log that can be analyzed or audited periodically or at other appropriate times. For example, a cloud manager might pull the logs once a day (such as in the middle of the night during off-peak hours) and determine which machines have undergone a reboot or similar action, which users are rebooting machines, how often users are rebooting machine, or any other such information. Appropriate actions then can be taken, such as changing the allocation or access for specific users, changing configuration information or policies applied for certain users, reimaging machines, closing ports on specific devices, etc.

In embodiments where a user or guest operating system is not granted permission to reboot or reset a machine, but where a reboot is detected that was not authorized by the cloud manager or other managing system, for example, an alarm can be generated that causes one or more specific actions to be taken. In one embodiment, a rule set or policy can be specified or applied for each user, user type, resource, resource group, etc. When a reboot or similar action is detected, the applicable rule or policy can be determined, and the appropriate action taken for the current circumstances. For example, the machine could be isolated from other resources across the network, the user could be removed from the machine, or power could be removed from the machine. The actions can differ upon the detected action, the particular customer, or any other such aspect that can affect the rule or policy to be applied. In one embodiment, a rule engine 426 can be provided that is configured to pull rule and/or policy information, as well as any appropriate user or resource information, etc., from a rules data store 428 (and any other appropriate data stores) to determine the appropriate action(s) to be taken for the situation. The rule engine in this example is shown to work through the cloud manager 414, although various other connections and communications paths can be used as well in other embodiments. In some systems the rules can be relatively static, where specific actions are taken for specific circumstances. In other cases, the rules applied can be much more dynamic, and can be tailored to the situation. For example, a power glitch, application bug, or other such unexpected event can cause a machine or device to reboot or reset, such that an occasional reboot for a customer might simply be logged and monitored, with no immediate action being taken. If, instead, several devices for a user are being reset, the system might decide to isolate all machines for that customer. Further, some customers might pay extra for the ability to reboot machines, while other customers might not be granted such ability. In some cases, a guest user can select rules and/or policies to be applied, and can be charged for the service accordingly. Various other actions and situations can apply as should be apparent.

In some embodiments, a user can specify the action to be taken in response to a detected reboot. For example, if a user provisioned on a machine never intends to authorize a reboot from the guest OS, then the guest could request that a machine be isolated any time the machine is rebooted from the OS, as it can be likely that the machine is compromised or has another such issue. In other cases, a user might want to be notified each time a machine reboots, such that the user can determine whether the reboot was expected, and can take action for unauthorized reboot or reset actions. In some cases a customer might not want to allow reboots for a host, and can specify a policy to power down any machine in the event of a reset or reboot. In other cases, a user might request a policy that the machines are not allowed to reboot automatically, as a user, cloud manager, or other such entity must first approve the action.

Figure 6:
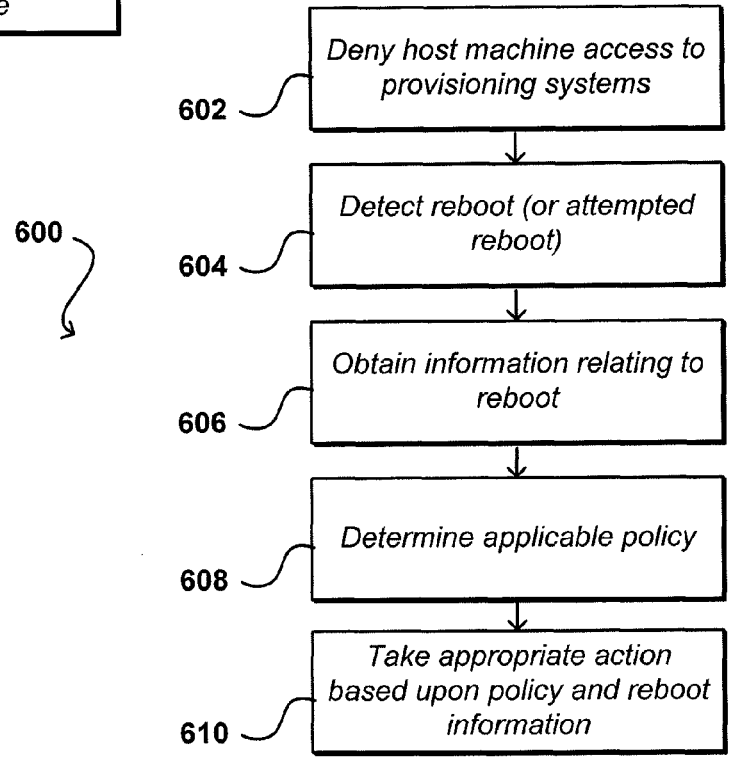
FIG. 6 illustrates an example of a process for acting upon an attempted reboot of a provisioned resource that can be used in accordance with one embodiment.

FIG. 6 illustrates an example process 600 that can be used in accordance with one embodiment to take an appropriate action in response to detecting a reboot or attempted reboot of a host machine or other such device. In this process, access to provisioning systems is denied to a host machine provisioned to a customer or other guest user 602. The access can be denied using any process discussed herein, although in some embodiments access to the provisioning can be allowed for at least some customers. During the customer's use of the machine, a cloud manager (or similar component or system) might detect a reboot (or attempted reboot) of the machine 604. Upon detecting a reboot, the cloud manager can determine information pertaining to the reboot 606, such as the current customer provisioned on the machine, the amount of time since the last detected reboot attempt for this machine or customer, the presence of reboot attempts on other machines provisioned for this customer, the time of day, any requests sent upon reboot, etc. The cloud manager also can determine the applicable policy, rule set, or other information to be applied 608, such as may depend upon the customer, resource, device type, etc. Based on the information and the applicable policy, the cloud manager can determine the appropriate action to take 610, such as notifying the user, isolating the host, removing power, or any of a number of other such actions.

In the example wherein power is to be removed from a device in the event of a reset, reboot, or similar action, there can be a number of approaches to removing such power. For example, a cloud manager or data center controller can manage the power supplied to individual machines in the cloud, data center, or managed network. In some embodiment this can involve what is sometimes referred to as "soft" power control, wherein each machine has the ability to shut down or power off. In one embodiment, a network service can communicate with each machine through a console port, or other port not exposed to the user, and can send instructions to the machine regarding the machine shutting itself off or otherwise taking itself offline. In one embodiment, which will be discussed referring back to FIG. 4, a console controller 430 receives a signal from a cloud manager 414 via a console port 432, and is able to signal the power supply unit (PSU) 434 to turn off via the motherboard, either via or independent of the CPU 408 for the device. In some embodiments the PSU cannot be shut off via the CPU but can only be shut down over the console port and a console controller, or a similar communication mechanism, such that a machine can only be powered down from across the network, such as by a cloud manager system. In embodiments where the host device cannot power itself off using the CPU or other such component, power to the machine or device can be controlled using a smart power strip or other such device that is external to the device and operable to physically supply power or prevent power from being supplied to a device. For example, several machines can be connected to receive power from a power strip including separately controllable (e.g., host specific) relays or other such components, such that a cloud manager or other such component can remotely turn off power to individual devices. In some embodiments a combination can be used, wherein a cloud manager first attempts to power down a device via the console port, and if the device does not respond then the cloud manager can cause an external power supplying device to remove power (e.g., AC power) from being supplied to the device.

The use of smart power strips or similar devices that can be controlled by a cloud manager also can allow machines to be powered on by supplying power to a machine via the power strip (or other smart outlet or supply) and then sending a "power on" or similar signal to the machine. Once power is supplied to a machine such as a server, there can be a small voltage (such as 5V) going to the console, independent of whether the device is "on" or "off," which is able to receive and process signals from across the network, such as from the control plane. This console can also utilize the console port or another port that is not exposed to the network, such that a user also will not be able to power on or startup devices, in addition to being unable to power down or reboot the devices.

In addition to preventing a user from rebooting a device from a network component, the ability to prevent a user from accessing various resources and components across the network via switches, routers, ports, and other such components can be used advantageously for other such purposes. For example, a machine that is determined to be in an "unknown" state, or that otherwise triggers a remedial action, can have communication paths across a network (such as to the Internet or other devices across the cloud) disabled, such as by removing power from a switch along the communication path, such that the guest OS or other code executing on the machine or device cannot communicate with any other devices and spread potentially malicious code or perform any unauthorized actions outside the host machine. There also can be various levels of action performed for various triggers. For example, a machine might always be prevented from accessing provisioning systems during a reboot of a machine when a guest is provisioned on the machine. If an attempt to reboot from the network is detected, the switches of the data plane can disable access from that machine to other components until the source of the attempt can be determined. If subsequent attempts are detected, power can be shut off to the machine such that the code on the machine will no longer execute and a human can examine and/or re-image the machine. As should be apparent, various other actions, sequences, triggers, and other such aspects can be included as well within the scope of various embodiments.

In some embodiments, certain access can be denied or "walled off" from the machine during certain times, such as during phases of reboot. For example, access to provisioning systems can be denied during phases of a reboot that allow new customer images to be flashed onto the machine, for example, which are not authorized by the cloud manager or other such management system. In one embodiment, guests can be prevented from provisioning a host machine using a PXE boot process to boot the host using an unauthorized network interface and bypass the information stored on hard disk (or other resident storage) for the machine. A guest could potentially modify the firmware on the device to cause the machine to utilize a particular PXE redirection service, or utilize an approved service but use unauthorized information, to cause the machine to obtain path information for a specific PXE boot server and obtain a network bootstrap program that can be loaded into memory and executed on the machine, resulting in potentially harmful code being executed on the machine. By denying specific network access or redirection during these periods, the opportunity for such misuse can be significantly reduced.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for preventing a host machine from accessing a provisioning system during reboot, comprising:
   under control of one or more computer systems configured with executable instructions,
   receiving a request from a user, the request capable of being processed by providing the user with native access to a host machine;
   provisioning a customer on at least one of a plurality of host machines using at least one provisioning system on a network;
   before the customer has access to perform operations on any provisioned host machine, directing at least one network switch along any communications path between the at least one provisioned host machine and the at least one provisioning system to disable communications between each provisioned host machine and each provisioning system for the duration of the time the user is utilizing the at least one host machine and while maintaining access to other communication paths of the network, wherein the user is unable to access the at least one provisioning system during a reboot of any of the at least one provisioned host machine; and
   after the customer is no longer provisioned on the at least one host machine, directing the at least one network switch between the at least one provisioned host machine and the at least one provisioning system to enable communications between each provisioned host machine and each provisioning system.

2. The computer-implemented method of claim 1, further comprising:
   before the user has access to perform operations on any provisioned host machine, setting a state of at least one network port on each provisioned host machine to a state that does not allow communication with the at least one provisioning system.

3. The computer-implemented method of claim 1, further comprising:
   detecting a reboot of a provisioned host machine; and
   removing power from the provisioned host machine for which the reboot was detected.

4. A computer-implemented method for blocking access to network resources for a hardware device accessible to a user, comprising:
   under control of one or more computer systems configured with executable instructions,
   providing a plurality of hardware devices for use by any of a plurality of managed users, each hardware device operating in an administrative network context and capable of accessing at least one administrative network resource;
   in response to a request from a user of the plurality of managed users, updating configuration information for at least one hardware device using the at least one administrative network resource to enable the user to utilize the at least one hardware device;
   before the user is capable of utilizing the at least one hardware device, switching the hardware device to a user network context including disabling a communication path by setting the configuration information for at least one network switch along a communications path between the hardware device and the at least one administrative network resource to disable communications between the hardware device and the at least one administrative network resource, wherein the hardware device is unable to access the at least one administrative network resource to modify the configuration information on the at least one hardware device for the duration of the time the user is utilizing the at least one hardware device; and
   after the user is finished utilizing the at least one hardware device, switching the hardware device back to the administrative network context.

5. The computer-implemented method of claim 4, wherein switching the hardware device to a user network context comprises disabling a communication path between the at least one hardware resource and the at least one administrative network resource.

6. The computer-implemented method of claim 4, wherein the administrative network resource is a provisioning system, and wherein updating the configuration information includes loading a customer image on the hardware device.

7. The computer-implemented method of claim 4, wherein the hardware device is a host machine including at least one network port configured to communicate with the at least one administrative network resource, and
   wherein switching the hardware device to the user network context comprises modifying a state of the at least one network port to prevent communications between the host machine and the at least one administrative network resource.

8. The computer-implemented method of claim 4, further comprising:
   monitoring network traffic for the at least one hardware device in the user network context;
   determining whether the monitored network traffic is indicative of a reboot of the at least one hardware device; and
   when network traffic is detected that is indicative of a reboot of the at least one hardware device, performing at least one action with respect to the hardware device.

9. The computer-implemented method of claim 8, wherein the action includes removing power from at least one network switch along any communications path between the hardware device and the at least one administrative network resource.

10. The computer-implemented method of claim 4, wherein the hardware device is prevented from performing an unauthorized reboot operation using information from the at least one administrative network resource.

11. The computer-implemented method of claim 8, wherein the action includes at least logging information for the detected attempt, notifying a user, isolating the hardware device, disabling specific communications from the network device, limiting access of the user to at least a portion of the hardware device, disabling at least some network communications, removing power from a network switch, or removing power from the hardware device.

12. The computer-implemented method of claim 4, further comprising:
    detecting at least an attempt by the hardware device to access information from the at least one administrative network resource; and
    executing at least one action in response to the detected attempt.

13. The computer-implemented method of claim 12, further comprising:
    applying at least one policy to determine the at least one action to execute in response to the detected attempt.

14. The computer-implemented method of claim 4, wherein the request is received on behalf of the user based upon a current need of the user for remote centralized resources under control of at least one management system.

15. The computer-implemented method of claim 4, further comprising:
    booting a host machine containing the at least one hardware device using a ramdisk.

16. The computer-implemented method of claim 4, further comprising:
    detecting an attempted reboot of the at least one hardware device;
    applying a policy for at least one of the user and the hardware device to determine a remedial action for the attempted reboot; and
    performing the remedial action.

17. The computer-implemented method of claim 16, wherein the remedial action includes at least logging information, notifying a user, isolating the at least one hardware device, disabling specific communications from the at least one hardware device, limiting user access to at least a portion of the at least one hardware device, or removing power from the processing device for which the reboot or attempted reboot was detected.

18. The computer-implemented method of claim 17, wherein removing power from the at least one hardware device comprises instructing a smart power device to remove power from reaching the processing device.

19. A computer-implemented method for blocking access to an administrative network resource for a hardware device accessible to a user, comprising:
    under control of one or more computer systems configured with executable instructions,
        providing a plurality of hardware devices for use by any of a plurality of managed users;
        in response to a request for a user of the plurality of managed users, updating configuration information for at least one hardware device using at least one administrative network resource to enable the user to utilize the at least one hardware device, updating the configuration information including disabling a communication path for at least one network switch along a communications path between the at least one hardware device and the at least one administrative network resource to disable communications between the hardware device and the at least one administrative network resource, a use context of the at least one hardware device being changed such that the at least one hardware device is unable to communicate with the at least one administrative network resource for the duration of the time the user is utilizing the at least one hardware device;
        monitoring network traffic for the at least one hardware device;
        when network traffic is detected that is indicative of a reboot of the at least one hardware device, performing at least one remedial action; and
        when the user is finished utilizing the at least one hardware device, updating the configuration information such that the at least one hardware device is able to communicate with the at least one administrative network resource.

20. The computer-implemented method of claim 19, wherein the network traffic is monitored offline using log information or in real time.

21. The computer-implemented method of claim 19, wherein the network traffic indicative of a reboot includes at least one of a Dynamic Host Configuration Protocol (DHCP) request or a pattern of packet timing.

22. A system for blocking access to network resources for a hardware device accessible to a user, comprising:
    a processor; and
    a memory device including instructions that, when executed by the processor, cause the processor to:
        provide a plurality of hardware devices for use, each hardware device operating in an administrative network context and capable of accessing at least one administrative network resource;
        in response to a request for a user of the plurality of managed users, update configuration information for at least one hardware device using the at least one administrative network resource to enable the user to utilize the at least one hardware device;
        before the user is capable of utilizing the at least one hardware device, switch the hardware device to a user network context wherein the hardware device is unable to access the at least one administrative network resource to modify the configuration information on the at least one hardware device for the duration of the time the user is utilizing the at least one hardware device; and
        after the user is finished utilizing the at least one hardware device, switch the at least one hardware device back to the administrative network context,
    wherein the hardware device is a host machine including at least one network port configured to communicate with the administrative network resource, and
    wherein switching the hardware device to a user network context comprises modifying a state of the at least one network port to prevent communications between the host machine and the at least one administrative network resource.

23. The system of claim 22, wherein the network resource is a provisioning system, and wherein updating the configuration information includes loading a customer image on the hardware device.

24. The system of claim 22, wherein switching the hardware device to the user network context comprises setting configuration information for at least one network switch along any communications path between the hardware device and the at least one administrative network resource to disable communications between the hardware device and the at least one administrative network resource.

25. The system of claim 22, wherein the instructions when executed further cause the processor to:
   detect at least an attempt by the hardware device to access information from the at least one administrative network resource; and
   execute at least one action in response, the action including at least logging information for the detected attempt, notifying a user, isolating the hardware device, disabling specific communications from the network device, or removing power from the hardware device.

26. A non-transitory computer readable storage medium storing instructions for blocking access to network resources for a hardware device accessible to a user, the instructions when executed by a processor causing the processor to:
   provide a plurality of hardware devices for use, each hardware device operating in an administrative network context and capable of accessing at least one administrative network resource;
   in response to a request for a first user, update configuration information for at least one hardware device using the at least one administrative network resource to enable the user to utilize the at least one hardware device;
   before the first user is capable of utilizing the at least one hardware device, switch the hardware device to a user network context wherein the hardware device is unable to access the at least one administrative network resource to modify the configuration information on the at least one hardware device for the duration of the time the user is utilizing the at least one hardware device; and
   after the user is finished utilizing the at least one hardware device, switch the at least one hardware device back to the administrative network context,
   wherein the hardware device is a host machine including at least one network port configured to communicate with the at least one administrative network resource, and
   wherein switching the hardware device to the user network context comprises modifying a state of the at least one network port to prevent communications between the host machine and the at least one administrative network resource.

27. The non-transitory computer readable storage medium of claim 26, wherein the network resource is a provisioning system, and wherein updating the configuration information includes loading a customer image on the hardware device.

28. The non-transitory computer readable storage medium of claim 26, wherein switching the hardware device to the user network context comprises setting configuration information for at least one network switch along any communications path between the hardware device and the at least one administrative network resource to disable communications between the hardware device and the at least one administrative network resource.

* * * * *